United States Patent [19]

Weers et al.

[11] Patent Number: 5,266,185
[45] Date of Patent: Nov. 30, 1993

[54] METHOD OF SUPPRESSION OF HYDROGEN SULFIDE WITH HETEROCYCLIC-AMINE ALDEHYDE REACTION PRODUCTS

[75] Inventors: Jerry J. Weers, Ballwin; Timothy J. O'Brien, St. Louis; Catherine E. Thomasson, Ellisville, all of

[73] Assignee: Petrolite Corporation, St. Louis, Mo.

[21] Appl. No.: 580,020

[22] Filed: Sep. 10, 1990

[51] Int. Cl.$^5$ .............................................. C10G 9/16
[52] U.S. Cl. .................................. 208/47; 208/370; 208/348; 208/189; 208/14; 210/749; 210/750; 210/757; 210/758; 44/333; 44/340; 44/350
[58] Field of Search ............... 210/749, 750, 757, 758; 208/47, 14; 252/8.555; 44/333, 340, 350

[56] References Cited

U.S. PATENT DOCUMENTS

| | | | |
|---|---|---|---|
| 2,265,051 | 12/1941 | Adams | 44/9 |
| 2,641,538 | 6/1953 | Thompson et al. | 41/63 |
| 3,265,512 | 9/1966 | Dickson et al. | 106/14 |
| 3,459,852 | 8/1969 | Roehm | 210/758 |
| 3,468,830 | 9/1969 | Kiss | 260/29.2 |
| 3,627,470 | 12/1971 | Hamblin | 210/758 |
| 4,309,294 | 1/1982 | Roberts . | |
| 4,329,250 | 5/1982 | Vougt | 210/749 |
| 4,473,115 | 9/1984 | Oakes | 252/8.555 |
| 4,762,627 | 8/1988 | Martinez | 252/8.555 |
| 4,956,160 | 7/1989 | Reichert | 210/744 |

FOREIGN PATENT DOCUMENTS 0352855 7/1989 European Pat. Off. .
0383499 2/1990 European Pat. Off. .

OTHER PUBLICATIONS

Studies of Metal Chelates Formed from Derivatives of 2-Thiopenealdehyde and Furfural (Coakley et al, J. Inorg. Nucl. Chem, 1969, vol. 31, pp. 1449 to 1458).
A Simple $^1$H nmr conformational study of some heterocyclic azomethines (Bottino et al, Can. J. Chem., vol. 59, 1981, pp. 1205-1207).
CA 70:120672n, 1969.
CA 63:9434d, 1965.

*Primary Examiner*—Helane Myers
*Attorney, Agent, or Firm*—Jeffrey S. Boone; Kenneth Solomon

[57] ABSTRACT

Hydrogen sulfide evolution in a heavy hydrocarbon (such as a residual fuel oil) derived from a heavy crude oil (such as a API 8 gravity crude) is suppressed by contacting the hydrocarbon with a compound corresponding to the reaction product of a heterocyclic aldehyde (such as furfural) and an organic primary amine.

11 Claims, No Drawings

METHOD OF SUPPRESSION OF HYDROGEN SULFIDE WITH HETEROCYCLIC-AMINE ALDEHYDE REACTION PRODUCTS

BACKGROUND OF THE INVENTION

The present invention relates to the suppression of hydrogen sulfide from hydrocarbons or water. In particular, the invention relates to such suppression by chemical means.

Hydrogen sulfide ($H_2S$) is a highly flammable and toxic gas (toxic Threshold Limit Value —Time Weighted Value = 10 ppm; Short Term Exposure Limit = 15 ppm). Hydrogen sulfide is encountered in many oil and gas formations and is a significant health hazard to oilfield and refinery workers. Accordingly, suppression of $H_2S$ in hydrocarbons, e.g., natural gas, crude oil, refined oil products, and associated water (including brine) is an important concern. Further, because of the large quantities of material to be treated, it is important to have a means of suppression that is economically efficient. Complicating the problem somewhat is the fact that some treatments will have excellent performance in one situation but poor performance in another. For instance, many treatments have undesirable side effects. Some treatments will alter the specifications of the material; e.g., viscosity, pour point, water emulsifying tendency, and some will contaminate the material with another hazardous substance; e.g., formaldehyde. Still further, the solubility of the treatment additive is sometimes a factor. All of these items often severely limit the chemistry available to scavenge hydrogen sulfide from a particular source.

One class of substances which is of particular importance with regard to hydrogen sulfide evolution is "heavy hydrocarbons" which, as used herein, means a crude oil or a refinery fractions in which at least 50 weight percent of the fraction has a boiling point of at least 240° C. (at atmospheric pressure). Such materials include petroleum residua, grease, lube oil, gas oil, diesel fuel, and coker unit distillates. Because of conventional refining practices, $H_2S$ suppression is not currently a significant issue for grease, lube oil, or gas oil, but could be in the future if refinery operations are altered.

The use of various aldehydes which react with hydrogen sulfide has been known in the prior art for sometime. For example, U.S. Pat. No. 2,426,318 discloses a method of inhibiting the corrosive action of natural gas and oil containing soluble sulfides on metals by utilizing certain aldehydes, preferably formaldehyde.

U.S. Pat. No. 4,680,127 suggests using glyoxal to reduce the amount of hydrogen sulfide in hydrogen sulfide-containing dry gaseous and wet gaseous media.

U.S. Pat. No. 4,515,759 discloses a process for removal of hydrogen sulfide from gas mixtures, particularly gas mixtures containing hydrocarbons, wherein the gas mixture is treated with a buffered aqueous solution of a water soluble nitrite, such as sodium nitrite.

Co-pending U.S. patent application Serial No. 07/388,210 now abandoned describes the suppression of hydrogen sulfide with the reaction product of an alkylenepolyamine and formaldehyde.

Co-pending U.S. patent application Serial No. 07/374,427 now abandoned, and a related case of which has issued as U.S. Pat. No. 5,169,411 describes the suppression of $H_2S$ with a reaction product of an amine or polyamine with an aldehyde or ketone. This broad disclosure does mention cyclic aldehydes, but it does not contain any disclosure of heterocyclic aldehydes.

Bottino, et al, Can. J. Chem., Vol. 59 (1981) p. 1205-1207 discloses the reaction product of furfural (2-furancarboxaldehyde) and 2-pyrrolecarboxaldehyde with butyl amine, but does not suggest the use of these materials as $H_2S$ scavengers. The article is merely a report of the type of structure formed by the reaction of these aldehydes and simple primary amines Robertson, J. Org. Chem., Vol. 25 (1960), p. 47–49, shows the reaction sequence used by Bottino, supra.

Hoyer, Z. Anorg. Allgem. Chem., 336(3-4), 192–6 (1965), [C. Abs. 63-9434d]; Hoyer, Z. Anorg. Allgem. Chem., 5(6), 231-2 (1965), [C. Abs. 63-16150e]; and Gallagher, J. Inorg. Nucl. Chem., (1969), 31(5), 1449-58, C. Abs. 70-120672n]discloses the reaction product of furfural, 2-pyridinecarboxaldehyde or 2-thiophenecarboxaldehyde with ethylene diamine (1,2diaminoethane) but do not mention the suppression of $H_2S$. These articles report the preparation of metal complexes (Zn, Co, Cu, and Ni) and the hydrolysis of such complexes.

SUMMARY OF THE INVENTION

The invention concerns a method of suppressing hydrogen sulfide in a heavy hydrocarbon derived from a heavy crude oil. The suppression is achieved by contacting the petroleum with a compound corresponding to the reaction product of a heterocyclic aldehyde and an organic primary amine.

The method of the invention is easy to carry out and is surprisingly effective compared to methods employing other compounds.

Cautions

Although this invention concerns hydrogen sulfide "suppression", it is important to understand that no composition can be certain to remove all hazardous levels of hydrogen sulfide under all circumstances. That is, hydrogen sulfide may appear in hazardous concentrations after a treatment that in similar circumstances had successfully suppressed hazardous concentrations. It is important that all potential sources of hydrogen sulfide be monitored and that any suppression means not be relied on as infallible.

DETAILED DESCRIPTION OF THE INVENTION

In this specification and claims, numerical values are not critical unless otherwise stated. That is, the numerical values may be read as if they were prefaced with the word "about" or "substantially".

The compounds useful in the instant invention are imines and are conveniently prepared by reacting together a heterocyclic aldehyde and an organic primary amine.

The heterocyclic aldehydes are generally of the formula

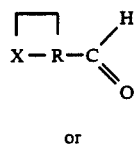

or

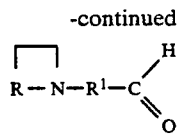

wherein X is N, O, or S, preferably O or S, more preferably O; R is an organic moiety having up to 12 carbon atoms and forming a 5 or 6 membered ring with X or N, desirably a hydrocarbon moiety having up to 8 carbon atoms, more desirably having up to 6 carbon atoms; and $R^1$ is a hydrocarbon or substituted hydrocarbon moiety having 1 to 6, desirably 1 to 4, and more desirably 1 to 2 carbon atoms. The heterocyclic aldehydes of Formula (I) are preferred to those of Formula (II).

An exemplary aldehyde is furfural (2furancarboxaldehyde)

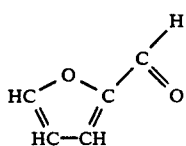

other useful aldehydes include 2-thiophenecarboxaldehyde, 3-thiophenecarboxaldehyde, 2-pyridinecarboxaldehyde, 3-pyridinecarboxaldehyde, pyrrole-2-carboxaldehyde, and pyrrole-3-carboxaldehyde.

In general, it is preferred that the aldehyde have a low molecular weight per aldehyde moiety. Compounds made from aldehydes with high ratios of molecular weight to number of aldehyde moieties will not perform as well as those with lower ratios.

The organic primary amines can be generally any organic compound having a primary amine functionality that does not contain a moiety which is antagonistic to the reaction with the aldehyde or the suppression of $H_2S$. This includes simple primary amines such as ethyl amine, propyl amine, butyl amine, and higher aliphatic or aromatic amines; and polyamines such as 1,2-diamino ethane, 1,2-diamino hexane, N-(2-aminoethyl)-1,2-diamino ethane (diethylene triamine), triethylene tetramine, and tetraethylene pentamine. Such amines may contain hetero atoms such as oxygen, for example:

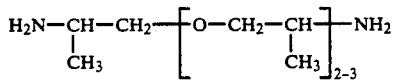

Preferred amines include polyamines of the formula

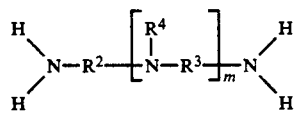

wherein $R^2$ and each $R^3$ are independently alkylene or oxyalkylene moieties having 1 to 12, desirably 1 to 3, preferably 2 carbon atoms; each $R^4$ is independently H or an alkyl moiety having 1 to 12 carbon atoms, desirably H or an alkyl moiety having 1 or 2 carbon atoms, preferably H; and m is 1 to 4, preferably 1 or 2, more preferably 1. Two $R^4$ groups may be combined, for example:

An exemplary compound according to this formula is that wherein m is 1, $R^2$ and $R^3$ are $C_2$, and $R^4$ is H; N-(2-aminoethyl)-1,2-diaminoethane (diethylene triamine).

Other preferred amines include polyamines of the formula

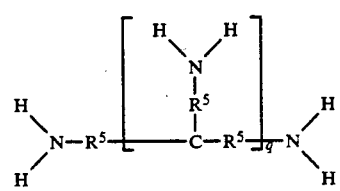

wherein each $R^5$ is independently an alkylene or oxyalkylene moiety having 1 to 5, preferably 1 to 4 carbon atoms; and q is 1 to 4, desirably 1 or 2, preferably 1. An exemplary compound of this formula is that wherein q is 1, one $R^5$ is $C_4$, one $R^5$ is $C_3$, and one $R^5$ is $C_1$ (1,8-diamino-4-aminomethyl-octane).

In general, it is preferred that the amines have a low molecular weight per primary amine moiety. Compounds made from amines with high ratios of molecular weight to number of primary amine moieties will not perform as well as those with lower ratios.

The aldehyde and amine are desirably reacted together under conventional conditions (mixing at room temperature or with mild heat) to yield an imine. The water of reaction is desirably removed by distillation (preferably vacuum distillation). The imine will have the general formula

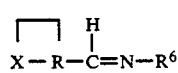

or

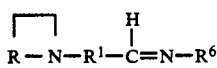

wherein R and $R^1$ are as defined above and $R^6$ is the residue of the amine.

It should be recognized that if the amine has more than one primary amine function or if the aldehyde has more than one aldehyde function that the resultant imine will be a polyimine and the stoichiometry of the reactants should be adjusted accordingly. It is greatly preferred that the aldehyde and amine not *both* be polyfunctional since this could result in higher molecular weight polymers which may not have appropriate solubility.

Although it is preferred that the compounds used in the invention be prepared by the above discussed reaction of an amine and an aldehyde, it is possible that they could be prepared by another means. Thus, it is important only that the imine correspond to an amine/aldehyde reaction product, not that it actually is such a reaction product.

The method of the invention requires that an effective amount of the above-described imine be contacted with a heavy hydrocarbon derived from a heavy crude oil. By "effective amount" is meant an amount sufficient to measurably reduce the quantity of evolved $H_2S$ compared to no treatment. While the precise amount of imine to be used will vary according to the specific imine compound used, the nature of the water or hydrocarbon to be treated, the level of $H_2S$ present, and the desired level of $H_2S$, in general the imines will be used at 10 to 3,000, desirably 25 to 2,000, preferably 50 to 1,000, and more preferably 100 to 500 ppm (weight basis). By "heavy hydrocarbon" is meant crude oil or a refinery fraction in which at least 50 weight percent of the fraction has a boiling point of at least 240° C. Thus, "heavy hydrocarbons" includes not only crude oil, but also petroleum residua, grease, lube oil, gas oil, diesel fuel, and coker unit distillates. Of these, crude oil, petroleum residua, diesel fuel, and coker unit distillates are of more significance. By "heavy crude oil" is meant crude oil having a high proportion of asphaltic and naphthenic components. Such crudes will have an API gravity of $\leq 15$, preferably $\leq 10$. Examples of such crudes are the crude oils commonly encountered in California (USA), the West coast of Mexico, Venezuela, and the Soviet Union.

Because heavy crudes and heavy hydrocarbons made therefrom are difficult to handle and process, it is common to dilute them with other products. For instance, two or more crude oils may be blended before being refined, and two refinery products may be combined. In this regard, the invention is generally applicable to such blends. Such blends will generally be at least 5, desirably at least 10, more desirably at least 20, and preferably at least 40 percent content consisting of or derived from a heavy crude oil.

In many instances, it will be advantageous to pretreat the oil or fraction with NaOH or a similar caustic before using the method of the invention. The caustic pretreatment can enable a lower $H_2S$ level to be obtained and will help reduce the cost of the $H_2S$ suppression.

The invention is particularly useful in the control of hydrogen sulfide from petroleum residua. Residua are black viscous materials obtained as a residue from the distillation of crude oil. They may be pourable liquids (generally from distillation at atmospheric pressure) or almost solid (generally from vacuum distillation). Residua (sometimes diluted with distillates to decrease its viscosity) is encountered commercially as bunker oil, fuel oil, marine fuel oil, and asphalt. Residua contain a complex blend of components which may include a variety of sulfur compounds which can lead to the formation of hydrogen sulfide.

Because of the very high viscosity of many residua, it is common practice to add distilled fractions such as diesel fuel to the residua to improve its handling properties, such as to reduce its viscosity for pumpability, sprayability, and so forth. In such cases it is advantageous to practice the method of the invention by adding the imine compound to the distillate and then add the distillate to the residua. This will allow a uniform distribution of the imine in the residua with a minimum of mixing.

Whether or not the imine compound is first dispersed in a carrier fluid, it is important that the imine be well dispersed in the oil or fraction. Insufficient mixing will lead to higher $H_2S$ headspace concentrations. However, it should be noted that because the compounds used in this invention react very quickly with $H_2S$, mixing is less important for this invention than it is for prior art methods.

The invention will be further illustrated by the following examples. In the examples all parts and percentages are by weight unless otherwise specified.

EXAMPLE 1

17.3 g of 1,8-diamino-4-aminomethyl-octane

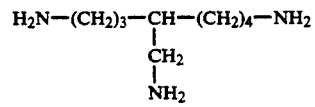

was stirred in 20 g of toluene while 28.8 g (3 equivalents) of 2-furfural were added dropwise. The mixture was heated to reflux to remove the water of reaction and a thick solution remained. Removal of the remaining toluene on a rotary evaporator left a liquid. The liquid was distilled (boiling point >230° C. at 2 torr (267Pa)) to yield a viscous dark orange oil. Since decomposition during the distillation was noted, the procedure was repeated, using the rotoevaporator to remove all of the solvent (i.e., no distillation) yielding a dark, viscous oil.

EXAMPLE 2

19.1 g (0.09 mole) of bis-hexamethylenetriamine [N(6-aminohexane)-1,6-diaminohexane]

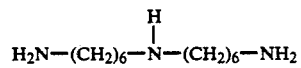

was mixed with 19.2 g (0.2 mole) of 2-furfural and 40 g of xylene (as a solvent) and heated to 50-70° C., with stirring, for one hour. The water of reaction was then distilled off into a Dean Stark Trap (water yield =2.1 g). The mixture was cooled, yielding a dark red oil.

EXAMPLE 3

0.4 mole of diethylenetriamine [N-(2-aminoethyl)-1,2-diaminoethane)

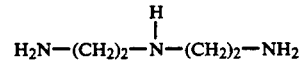

was dissolved in 53 g of Solvesso 150 aromatic solvent and 0.8 mole of 2-furfural was added dropwise with stirring. With the stirring continued, the mixture was heated to 70° C. for one hour. 20 ml of xylene was added and the water removed by distillation. (the temperature in the distillation flask was allowed to reach 170° C.). The product was a thick, dark oil.

EXAMPLES 4-13

Generally following the procedures of Examples 1-3, the following reactants were reacted to produce an imine:

EXAMPLE 4 aldehyde: (2) equivalents) 2-furfural amine: Texaco D-230 amine

-continued

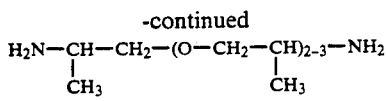

EXAMPLE 5 aldehyde: 2-furfural
amine: butylamine

EXAMPLE 6 aldehyde: (2 equivalents) 2-furfural
amine: 1,2-diaminocyclohexane

EXAMPLE 7 aldehyde (2 equivalents) furfural amine: Du Pont Dytek A amine

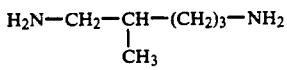

EXAMPLE 8 aldehyde: (2 equivalents) furfural
amine: ethylenediamine
Note: product is a solid

EXAMPLE 9 aldehyde: 2-thiophencarboxyaldehyde

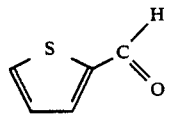

amine: butylamine
Note: compare Examples 10 and 13

EXAMPLE 10 aldehyde 3-thiophenecarboxaldehyde
amine: butylamine

EXAMPLE 11 aldehyde: 2-pyridinecarboxaldehyde

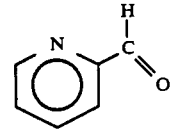

amine: butylamine
Note: compare Example 12

EXAMPLE 12 aldehyde: 3-pyridinecarboxaldehyde
amine: butylamine

EXAMPLE 13 aldehyde: pyrrole-2-carboxaldehyde

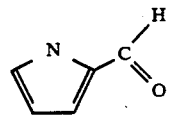

amine: butylamine

EXAMPLE 14

A 500 g sample of straight run residue (atmospheric tower bottoms) derived from a heavy crude oil (California origin) was mixed with 100 ppm of a compound, the container sealed, placed in a 180° F. (82° C.) oven for two hours. The hydrogen sulfide in the head space of the container was measured using a Kitagawa detection tube. The procedure was repeated with other compounds and the results reported in Table I.

TABLE I

| Additive (100 ppm) | $H_2S$ (ppm volume) |
|---|---|
| *blank (0 ppm) | 1100 |
| *Compound A[(1)] | 1000 |
| *Compound B[(2)] | 800 |
| Example 1 | 500 |
| Example 6 | 500 |

*Not an example of the invention.
[(1)]A condensate of formaldehyde and a hindered primary amine.
[(2)]The condensate of formaldehyde and 1,8-paramenthanediamine (limonene diamine, described in Example 11 of the aforementioned U.S. Ser. No. 07/374,427).

EXAMPLE 15

A residual fuel oil containing 28% pitch derived from crude oil produced in the San Joaquin Valley (California), the remainder being pitch derived from Alaskan North Slope crude and gas oil, was sampled using a 1 liter Welker CP2-1000A sample cylinder (Welker Engineering Co., Sugar Land, Tex.) in a manner so as to have no headspace (i.e., no air) in the cylinder. A treatment compound was introduced via a port on the side of the cylinder and thorough mixing achieved b five transfers to a Welker CP2- 1000MA automixer. A headspace equal in volume to the liquid was created by expelling half of the sample and introducing normal air. After the headspace $H_2S$ level reached equilibrium, an $H_2S$ headspace concentration was recorded. The entire sampling, mixing, and measuring process took place at 125°-145° F. (52°-63° C.). Some samples were subjected to a treatment with NaOH prior to treatment with the organic compound. The data are reported in Table II.

TABLE II

| Sample | Organic Compound | Organic Compound Treatment Level (ppm) | NaOH Pretreatment (ppm Na) | Headspace $H_2S$ (ppm) |
|---|---|---|---|---|
| —1* | — | — | — | 2800 |
| —2* | — | — | 70 | 850 |
| —3* | Compound A[(1)] | 1500 | — | 480 |
| —4* | " | 500 | 70 | 250 |
| —5* | Compound C[(2)] | 1500 | — | 1200 |
| —6* | " | 500 | 70 | 350 |
| —7 | Example 1 | 1500 | — | 500 |
| —8 | " | 500 | 70 | 140 |

TABLE II-continued

| Sample | Organic Compound | Organic Compound Treatment Level (ppm) | NaOH Pretreatment (ppm Na) | Headspace H$_2$S (ppm) |
|---|---|---|---|---|
| −9[3] | " | 500 | 70 | 80 |
| −10 | Example 3 | 1500 | — | 50 |
| −11 | " | 500 | — | 300 |
| −12 | " | 500 | 70 | 50 |
| −13[3] | " | 250 | 70 | 120 |

*Not an example of the invention.
[1]A condensate of formaldehyde and a hindered primary amine.
[2]A condensate of formaldehyde and an alkyl secondary amine.
[3]Mixed 3–4 times as long as the other samples.

EXAMPLE 16

The procedure of Example 15 was repeated with a residual fuel oil containing 32% San Joaquin Valley pitch, the remainder being pitch from an Alaskan North Slope crude oil and distillates from the two crudes. The data are reported in Table III.

TABLE III

| Sample | Organic Compound | Organic Compound Treatment Level (ppm) | NaOH Pretreatment (ppm Na) | Headspace H$_2$S (ppm) |
|---|---|---|---|---|
| −1* | — | — | — | 800 |
| −2* | — | — | 70 | 600 |
| −3* | Compound A[1] | 1000 | 70 | 175 |
| −4* | " | 500 | 70 | 200 |
| −5* | Compound C[2] | 1000 | 70 | 200 |
| −6* | " | 500 | 70 | 250 |
| −7 | Example 1 | 1000 | 70 | 0 |
| −8 | " | 500 | 70 | 100 |
| −9[3] | " | 500 | 70 | 50 |
| −10 | Example 3 | 1000 | 70 | 0 |
| −11 | " | 500 | 70 | 100 |
| −12[3] | " | 250 | 70 | 40 |

*Not an example of the invention.
[1][2]See Table II.
[3]Mixed 3–4 times as long as the other samples.

EXAMPLE 17

The procedure of Examples 15 and 16 was repeated with residual fuel oils containing varying amounts of pitch from a San Joaquin Valley crude oil and the compound of Example 3. The results are reported in Table IV.

TABLE IV

| Sample | San Joaquin Valley Pitch (%) | Compound of Example 3 (ppm) | NaOH Pretreat (ppm Na) | H$_2$S Headspace (ppm) |
|---|---|---|---|---|
| −1* | 7 | — | — | 960 |
| −2* | " | — | 70 | 0 |
| −3 | " | 50 | — | 10 |
| −4 | " | 25 | — | 50 |
| −5* | 7 | — | — | 625 |
| −6* | " | — | 85 | 400 |
| −7 | " | 1000 | — | 375 |
| −8 | " | 100 | — | 500 |
| −9[1] | " | 50 | — | 600 |
| −10 | " | 1000 | 70 | 10 |
| −11[1] | " | 750 | 70 | 150 |
| −12 | " | 500 | 70 | 475 |
| −13* | 7 | — | — | 1050 |
| −14* | " | — | 70 | 750 |
| −13 | " | 3000 | — | 75 |
| −14 | " | 1500 | 70 | 30 |
| −15* | 22 | — | — | 775 |
| −16* | " | — | 70 | 700 |
| −17 | " | 1000 | — | 40 |
| −18 | " | 500 | — | 200 |
| −19 | " | 1000 | 70 | 15[2] |
| −20 | " | 500 | 70 | 60 |
| −21 | " | 250 | 70 | 100 |
| −22 | " | 125 | 70 | 225 |
| −23* | 46 | — | — | 1900 |
| −24* | " | — | 70 | 1600 |
| −25 | " | 500 | 70 | 100 |
| −26[3] | " | 500 | 70 | 75 |
| −27 | " | 500 | 35 | 325 |
| −28 | " | 500 | — | 550 |

*Not an example of the invention.
[1]Mixed twice as long as other samples.
[2]Average of two runs.
[3]Mixed three times as long as other samples.

What is claimed is:

1. A method of suppressing evolution of hydrogen sulfide from a heavy hydrocarbon, comprising contacting the hydrocarbon with an effective amount to suppress evolution of hydrogen sulfide of an imine corresponding to the reaction product of
    (1). a heterocyclic aldehyde; and
    (2). an organic primary amine.
2. The method of claim 1 wherein the heterocyclic aldehyde has the general formula

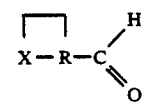

(I)

or

-continued

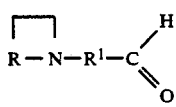 (II)

wherein X is N, O, or S; R is an organic moiety having up to 12 carbon atoms and completing a 5 or 6 membered ring in the formula; and $R^1$ is a hydrocarbon or substituted hydrocarbon moiety having 1 to 6 carbon atoms.

3. The method of claims 1 or 2 wherein the organic primary amine has the formula

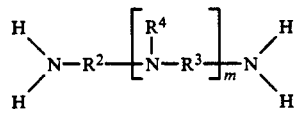 (IV)

wherein $R^2$ and each $R^3$ are individually a $C_1$ to $C_{12}$ alkylene or oxyalkylene moiety; each $R_4$ is individually H or a $C_1$ to $C_{12}$ alkyl moiety; and m is to 4; or

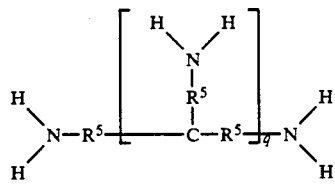 (V)

wherein each $R^5$ is individually a $C_1$ to $C_{12}$ alkylene or oxyalkylene moiety; and q is 1 to 4.

4. The method of claim 3 wherein the hydrocarbon is crude oil or petroleum residua.

5. The method of claim 3 wherein the hydrocarbon has an API gravity of not more than 15.

6. The method of claim 3 wherein the hydrocarbon has been previously treated with a caustic.

7. The method of claim 3 wherein said aldehyde is 2-furfural, 3-furfural, 2-thiophenecarboxaldehyde, 3-thiophenecarboxaldehyde, 2-pyridinecarboxaldehyde, 3-pyridinecarboxaldehyde, pyrrole-2-carboxaldehyde, and pyrrole-3-carboxaldehyde.

8. The method of claim 7 wherein said aldehyde is 2-furfural.

9. The method of claim 3 wherein $R^2$ and $R^3$ each independently have 1 to 3 carbon atoms, and $R^4$ is H or has 1 or 2 carbon atoms.

10. A method as set forth in claim 1, wherein the aldehyde or the amine or both is monofunctional.

11. A method of suppressing evolution of hydrogen sulfide from a heavy hydrocarbon, comprising contacting the hydrocarbon with an effective amount to suppress evolution of hydrogen sulfide of an imine corresponding to the reaction product of
   a. a heterocyclic aldehyde; and
   b. an organic primary amine;
the reaction product having the formula:

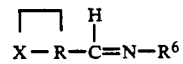

or

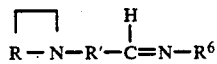

wherein X is N, O, or S; R is an organic moiety having up to 12 carbon atoms and completing a 5 or 6 membered ring in the formula; and $R^1$ is a hydrocarbon or substituted hydrocarbon moiety having 1 to 6 carbon atoms.

* * * * *

UNITED STATES PATENT AND TRADEMARK OFFICE
CERTIFICATE OF CORRECTION

PATENT NO. : 5,266,185
DATED : November 30, 1993
INVENTOR(S) : Weers et al.

It is certified that error appears in the above-identified patent and that said Letters Patent is hereby corrected as shown below:

Column 12:
In claim 7, line 9, delete the word "and" and substitute therefor -- or --.

Signed and Sealed this

Thirteenth Day of December, 1994

Attest:

BRUCE LEHMAN

Attesting Officer      Commissioner of Patents and Trademarks